(12) United States Patent
Paulino

(10) Patent No.: US 8,782,134 B2
(45) Date of Patent: Jul. 15, 2014

(54) COMMON ORGANIZATION ESTIMATION AT REGISTRATION

(75) Inventor: Roderick Carlos Paulino, Renton, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 12/623,835

(22) Filed: Nov. 23, 2009

(65) Prior Publication Data

US 2011/0125843 A1      May 26, 2011

(51) Int. Cl.
   *G06F 15/16* (2006.01)
(52) U.S. Cl.
   USPC .......................................................... 709/204
(58) Field of Classification Search
   CPC .................................................. H04L 67/1044
   USPC .......................................................... 709/204
   See application file for complete search history.

(56) References Cited

U.S. PATENT DOCUMENTS

| | | | |
|---|---|---|---|
| 5,534,855 A * | 7/1996 | Shockley et al. | 340/5.52 |
| 2004/0103312 A1 | 5/2004 | Messerges et al. | |
| 2004/0148238 A1 | 7/2004 | Bookstaff et al. | |
| 2005/0228853 A1 | 10/2005 | Yamamura et al. | |
| 2007/0150603 A1 * | 6/2007 | Crull et al. | 709/227 |
| 2007/0161382 A1 * | 7/2007 | Melinger et al. | 455/456.1 |
| 2007/0169189 A1 | 7/2007 | Crespo et al. | |
| 2009/0083184 A1 | 3/2009 | Eisen | |

OTHER PUBLICATIONS

Email-Based Identification and Authentication: An Alternative to PKI?—Published Date: 2003 http://ieeexplore.ieee.org/stamp/stamp.jsp?tp=&arnumber=1253564&isnumber=28051 (pp. 20-26).
Anokhin, Data Integration: Inconsistency Detection and Resolution Based on Source Properties—Published Date: 2006 http://cs.gmu.edu/~ami/research/publications/pdf/fmii01.pdf (15 pages).

* cited by examiner

*Primary Examiner* — Wing F Chan
*Assistant Examiner* — Andrew Woo
(74) *Attorney, Agent, or Firm* — Louise Bowman; David Andrews; Micky Minhas

(57) ABSTRACT

The registration of an individual for a service while providing protection against unintentional duplication of registration for the same organization. Upon receiving a request to register for a service from an individual over a network, it is automatically estimated as to whether the individual requesting registration belongs to the same organization as a prior registrant for the service. If so, the service notifies the individual requesting registration that they might belong to the same organization as a prior registrant. In one embodiment, it is then left to the individual as to whether they want to continue registering for the service.

18 Claims, 3 Drawing Sheets

COMMON ORGANIZATION ESTIMATION AT REGISTRATION

BACKGROUND

A wide variety of services are offered over the Internet. In order to obtain such services, it is often required to register or otherwise sign up for the service. The service consumer may be an individual, or an individual may register for the service on behalf of an organization that is to consume the service. Sometimes, an organization may be large enough that multiple individuals may register for the service on behalf of different parts of the organization. Occasionally, multiple individuals from an organization may inadvertently register for a service on behalf of an organization, where multiple registrations were not helpful. In that case, one of the registrations might be later revoked. This causes work for the individual making the registration, and also causes some administrative burden on the service provider. It may also involve synchronization between the registrations such that data associated with the service being offered through one registration is made compatible with data associated with the service being offered through the other registration.

BRIEF SUMMARY

Embodiments described herein relate to the registration of an individual for a service while providing protection against unintentional duplication of registration for the same organization. Upon receiving a request to register for a service from an individual over a network, it is automatically estimated as to whether the individual requesting registration belongs to the same organization as a prior registrant for the service. If so, the service notifies the individual requesting registration that they might belong to the same organization as a prior registrant. In one embodiment, it is then left to the individual as to whether they want to continue registering for the service.

This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

In accordance with embodiments described herein, the registration of an individual for a service is facilitated while providing protection against unintentional duplication of registration for the same organization. First, some introductory discussion regarding computing systems will be described with respect to FIG. 1. Then, various embodiments of an example registration process will be described with reference to FIGS. 2 and 3.

Figure 1:
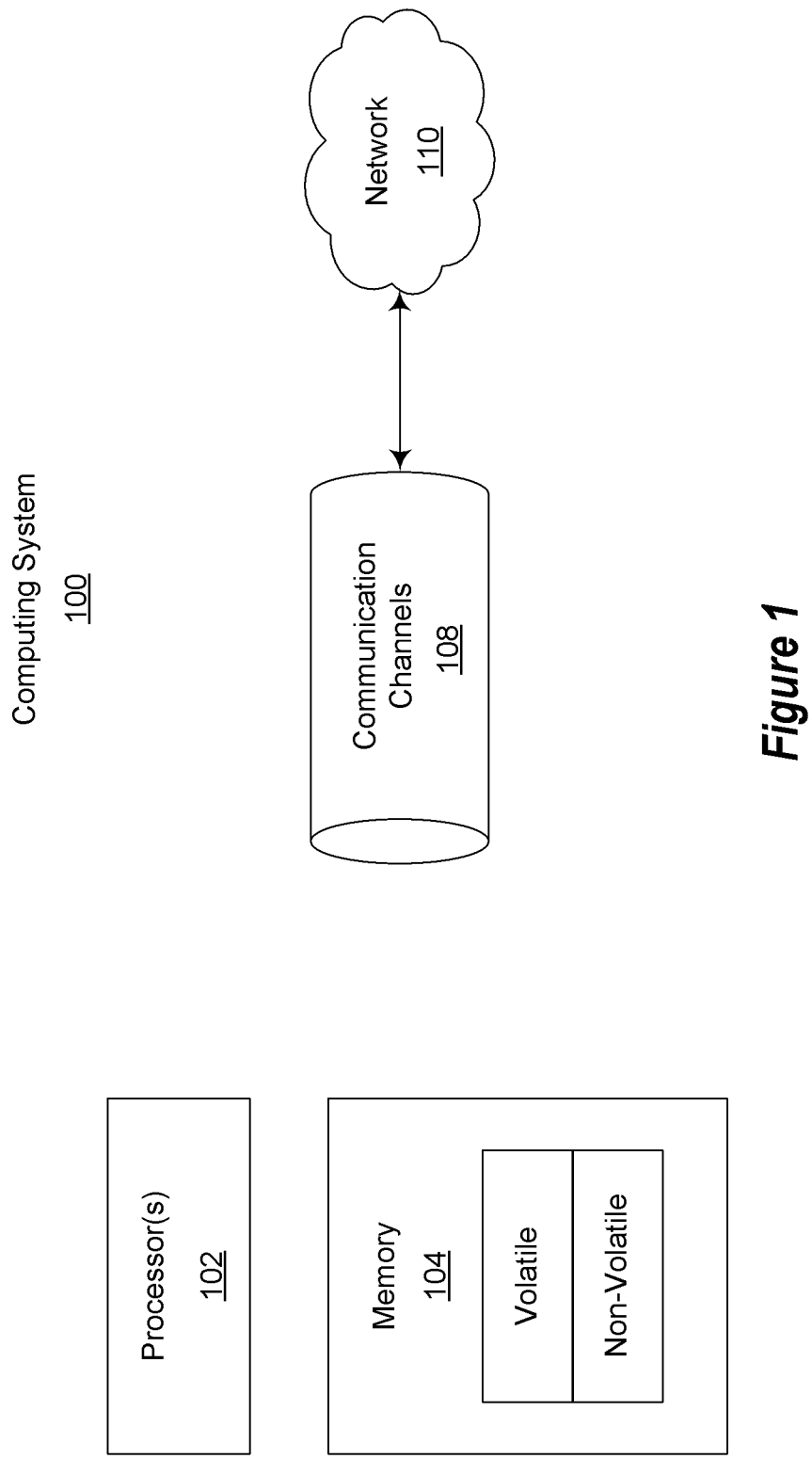
FIG. 1 illustrates an example computing system that may be used to employ embodiments described herein.

First, introductory discussion regarding computing systems is described with respect to FIG. 1. FIG. 1 illustrates a computing system, which may implement a message processor in software. Computing systems are now increasingly taking a wide variety of forms. Computing systems may, for example, be handheld devices, appliances, laptop computers, desktop computers, mainframes, distributed computing systems, or even devices that have not conventionally considered a computing system. In this description and in the claims, the term "computing system" is defined broadly as including any device or system (or combination thereof) that includes at least one processor, and a memory capable of having thereon computer-executable instructions that may be executed by the processor. The memory may take any form and may depend on the nature and form of the computing system. A computing system may be distributed over a network environment and may include multiple constituent computing systems.

As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "module" or "component" can refer to software objects or routines that execute on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 104 of the computing system 100.

Computing system 100 may also contain communication channels 108 that allow the computing system 100 to communicate with other message processors over, for example, network 110. Communication channels 108 are examples of communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media. The term computer-readable media as used herein includes both storage media and communications media.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise physical storage and/or memory media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

Figure 2:
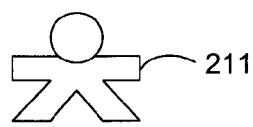
FIG. 2 illustrates a network environment that includes individuals communicating over a network to register for a service.
Figure 2:
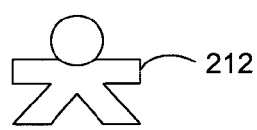
Figure 2:
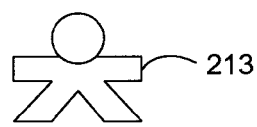
Figure 2:
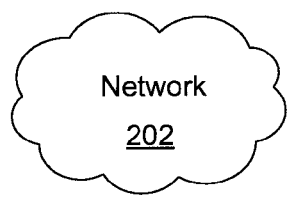
Figure 2:
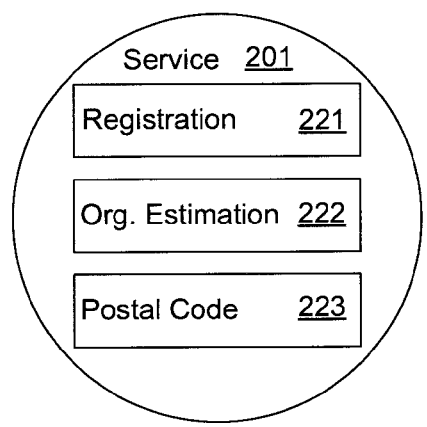

FIG. 2 illustrates a network environment 200 that includes individuals communicating over a network 202 with a service 201. The service 201 might be implemented, for example, on a computing system, an example of which is the computing system 100 of FIG. 1. The network 202 might be, for example, the Internet or another Wide Area Network. In the illustrated case, there are three individuals 211, 212 and 213 shows as having communicated (not necessarily at the same time) with the service 201 for purposes of registering with the service. However, the principles described herein apply regardless of the number of individuals that have register, or are registering, with the service 201. Three individuals are illustrated purely for purposes of illustration only.

The service 201 includes a registration module 221 that is configured to receive and process requests for registration (also referred to as "sign-up") for the service 201. As part of the registration process, the registration module 221 gathers information regarding the individual requesting registration. An organization estimation module 222 is configured to automatically estimate whether individuals requesting registration might belong to the same organization as a prior registrant for the service 201. If the organization estimation module estimates that the individual requesting registration may be a member of the same organization as a prior registrant, the registration module 221 notifies the requesting individual that there may already be a registration performed for that organization. The service 201 may also include a postal code module 223, which has a function that is described further below. The registration module 221, the organization estimation module 222, and the postal code module may indeed be separate modules, or may simply represent general functionality that may be provided by the service 201.

Figure 3:
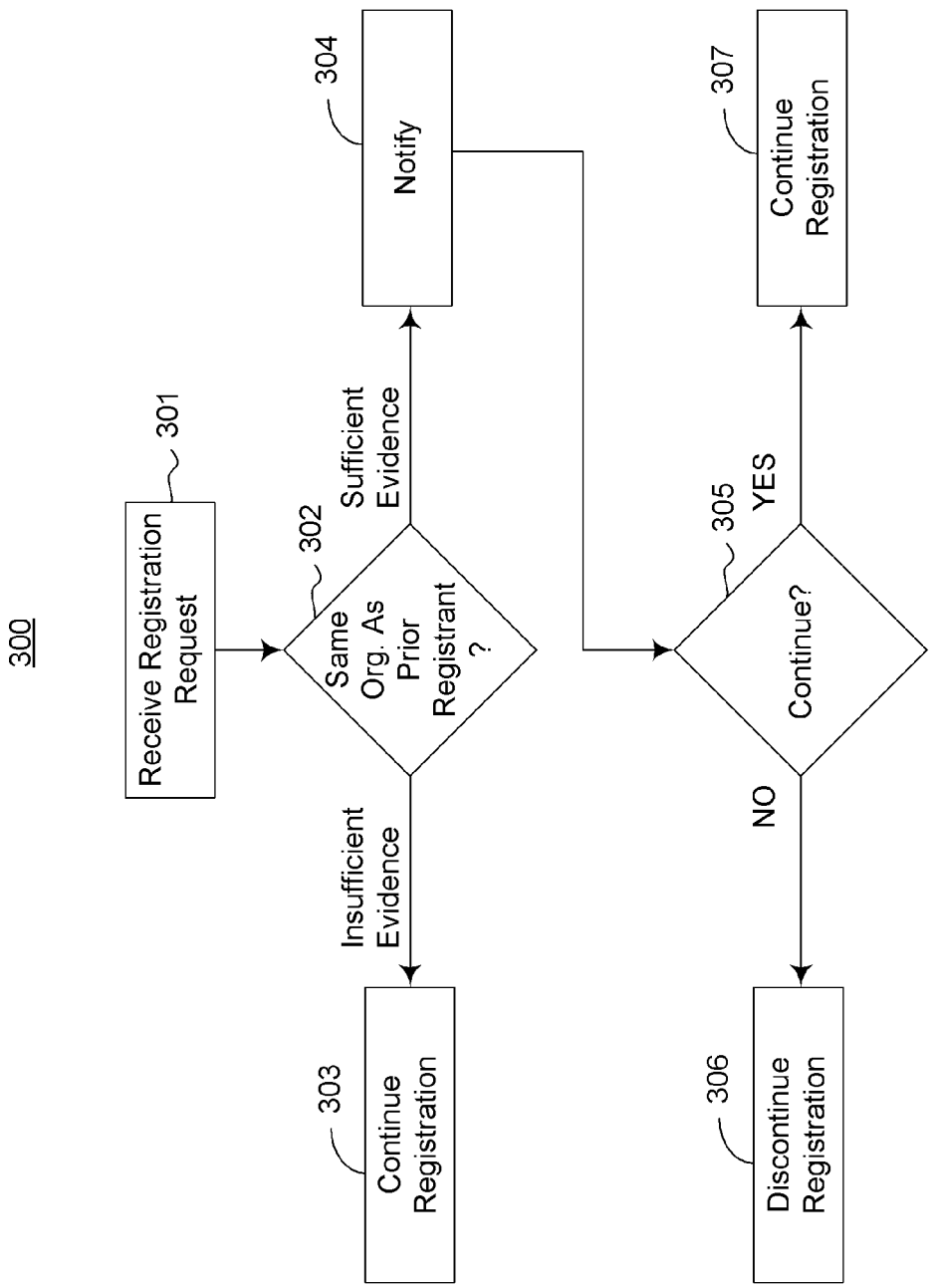
FIG. 3 illustrates a flowchart of a method for estimating whether an individual is a member of the same organization as a prior registrant.

FIG. 3 illustrates a flowchart of a method 300 for a computing system to register a service consumer for a service. The method 300 will be described with respect to the environment 200 of FIG. 2 in the case where individuals 211 through 213 all belong to the same organization, and in which individual 211 registers first, followed by individual 212, and followed by individual 213. In the example, for discussion purposes only, assume that each individual 211, 212, and 213 belongs to XYZ Fictional Corporation.

First, individual 211 registers by submitting a request to register for the service over the network 202 to the service 201. The registration request is received by the service 201 (act 301), whereupon the service gathers information from the individual as part of the registration process.

The service 201 then determines if there is sufficient evidence from which to estimate that the individual 211 is a member of the same organization as any prior registrant (decision block 302). This may be a continuous decision that is made each time the individual submits new information. Alternatively, if there are multiple stages of providing registration information, the decision may be made at the end of each stage of registration. Alternatively, the organization estimation decision may be postponed until all of the registration information is provided by the individual.

Initially, assume that there is insufficient evidence to estimate that the individual 211 is a member of the same organization as a prior registrant (No in decision block 302). In that case, registration continues (act 303). This continuation may involve gathering further information from the individual, which might result in another attempt to estimate whether the individual belongs to the same organization as a prior registrant (decision block 302), or may simply result in the finalization of the registration.

Next, individual 212, also a member of the XYZ Fictional Corporation, initiates registers. Upon receiving the request to register for the service from the second individual 212, the service 201 gathers registration information from the second individual 212 (act 301). At some point, the service 201 automatically estimates that the individual might belong to the same organization as a prior registrant for the service (Yes in decision block 302). In that case, the second individual 212 is notified over the network that there exists a prior registrant that might belong to the same organization as the individual (act 304).

At this point, the service 201 might simply terminate the registration process. However, in many implementations, since the service 201 might not have made a correct estimation, or since the service 201 might reasonably be offered to multiple individuals within the same organization, the service 201 awaits a decision from the individual as to whether they are to continue registering (decision block 305). In the case of individual 212, assume that the individual 212 simply did not realize that the individual 211 had registered for the service on behalf of the same regional branch of XYZ Fictional Corporation to which individual 212 belonged. Realizing that individual 212 already has access to the desired service due to a prior registration, the individual 212 provides an indication to the service that the registration process is to be cancelled without completing (No in decision block 305), whereupon the service discontinues the registration process (act 306).

Next, individual 213, also a member of the XYZ Fictional Corporation, initiates registers. Upon receiving the request to register for the service from the third individual 213 (act 301), the service 201 gathers registration information from the third individual 213. At some point, the service 201 automatically estimates that the individual might belong to the same organization as a prior registrant for the service (Yes in decision block 302). In that case, the third individual 213 is notified over the network that there exists a prior registrant that might belong to the same organization as the individual (act 304). The service 201 then awaits a decision from the individual as to whether they are to continue registering (decision block 305). In the case of individual 213, assume that the individual 213 does want to continue registering (Yes in decision block 305). In this case, the service continues registering (act 307).

It may be completely valid in some circumstances for two individuals of the same organization to register for the service. For instance, perhaps the individuals were only registering for the service on their own behalf, and not on behalf of the organization. One of the individuals might be registering on behalf of the entire organization, but the other individual is registering for the service for personal use that falls outside of the licensing agreement made by the first individual. One of the individuals might be registering on behalf of a portion of the organization, while the other might be registering on behalf of another portion of the organization. Regardless, the individual is presented with the possibility that another might have already registered on his or her behalf, and is presented with an informed option to discontinue registration. Thus, the instances of unintentional duplicate and overlapping registrations may decline. Any avoided unintentional registration means less hassle for the registrant to deregister, and reduced administrative costs for the service.

More details will now be described as to how the service might automatically estimate whether an individual currently registering belongs to the same organization as a prior registrant.

The service might use a domain name supplied in an e-mail address of the individual current registering. Sometimes, domain names, in and of themselves, may not convey any information at all regarding which organization an individual may belong to. For example, some Internet service providers supply e-mail addresses to tens of millions of customers, regardless of any organization to which the customers belong. The Internet service providers often provide e-mail addresses with a common e-mail address. Other domain names, however, do suggest information regarding the organization to which they belong. For instance, a domain name of "xyzcorporation.com" when provided in an e-mail address might be highly suggestive that the individual possessing that e-mail address in an employee of the XYZ Fictional Corporation. Other organizations provide e-mail address to their members, in which the domain names are highly suggestive of the member belonging to the organization.

From the domain name of the e-mail address, the service might estimate an organization to which belongs the individual currently registering. If the prior registrant provided an e-mail address also with the same domain name, or otherwise was associated with the same organization, a possible match of organizations may have been detected. Of course, this organization estimation is not always accurate, but since the individual is left with the final decision on whether to continue registering in one embodiment, the service is not required to be perfectly accurate on its estimation.

When an individual provides an e-mail address, the service might be able to obtain supplemental data from other sources regarding the individual. For instance, the individual might have previously associated the e-mail address with an account, which has additional data regarding the e-mail address. Part of that additional data might be an organization identifier associated with the account. This technique might also be applied to estimating an organization to which a prior registrant belongs.

In a direct approach, the service might obtain expressly the individuals statement regarding the organization name to which the individual belongs. This might be an optional piece of information requested of the registrant. The organization name might have also been acquired directly from a prior registrant in the same way. The service might be sophisticated enough to ignore some variation in how the organization's name is presented. For instance, the service might ignore capitalization, and may accept some abbreviated forms of words. For example, "corp", "corp." or "corporation" might be accepted as equivalent. The absence of an organizational type marker, such as "LLC", "PC", "Inc." or even "corporation" and so forth, might be ignored completely since sometimes people include such markers when identifying their organization, and sometimes they do not.

The postal code provided by the individual might also be used to identify the organization to which the individual belongs. Although there may be many organizations within a single postal code, the postal code may nevertheless be helpful, in conjunction with other information, to estimate an organization to which the individual belongs. For instance, if a domain name is not quite sufficient to determine that an individual belongs to the XYZ Fictional Corporation, the presence of a postal code that is consistent with the XYZ Fictional Corporation may be sufficient to warrant a tentative association of the individual with the XYZ Corporation.

Referring back to FIG. 2, recall that the service 201 has a postal code module 223. This might further be helpful in that the service 201 might associated the individual postal code with a particular geographical location. Thus, a more sophisticated notification may be provided to the individual in case of a possible estimation of common organization with a prior registrant. For instance, if individual 211 registered for the organization in San Francisco, and the individual 213 was in Boston, Mass., this information may be presented to the individual to help the individual determine if it is appropriate to have a second individual register for the service. The service might even present a map to show the location of the prior registrant, and or the current registrant's current location, based on postal code.

In one example implementation, the registration process involves two stages. In a first stage, the individual is presented with a web page in which the individual is asked to enter an e-mail address. Of course, information regarding privacy statements of the service may also be presented at this first stage. The individual is presented with controls in which the individual may cancel registration without proceeding beyond the first stage. The individual may also enter an e-mail address and submit the e-mail address.

If the e-mail address is already registered with the service, the individual is then presented with a password text box, where the individual may sign into the service to which he/she has previously registered. If the e-mail address is not already in the system, an account may be created for the individual, ready for population by information provided by the individual. It is possible that even if the individual has not already registered for the service, the service might still have information associating the e-mail address with an account of some type. Such information from the account may be used as part of the registration process, even though the individual does not directly enter that information.

In the second stage of registration, the individual might be presented with fields in which the individual is permitted to select a password, enter an organization name, enter a postal code, and enter other information such as first and last name. Once again, some of this information may be used to estimate whether the individual belongs to the same organization as a prior registrant.

Accordingly, the principles described herein allow an individual to register for a service with reduced likelihood of redundant registrations, thereby saving the individual and the service. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, implemented at a computing system that includes one or more processors, for protecting against unintentional duplicate registrations for a service by different individuals belonging to the same organization, the method comprising:
an act of receiving a request to register for a service from a particular individual over a network, the request including particular registration information provided by the particular individual;
an act of automatically estimating that the particular individual might belong to the same organization as another individual who is a prior registrant for the service, by comparing the particular registration information with prior registration information previously provided by the prior registrant, which includes comparing a postal code and an organization name provided by the particular individual in the first registration information with a postal code and an organization name previously provided by the prior registrant;
prior to registering the particular individual to the service, an act of notifying the particular individual over the network regarding a prior registration of at least the prior registrant that is already registered to the service that might belong to the same organization as the particular individual; and
an act of presenting the particular individual with an option to continue registering despite the existence of the prior registrant, or to cease registration;
in response to the presenting the option, an act of receiving a first indication from the particular individual that the particular individual is to continue registering.

2. The method in accordance with claim 1, the method further comprising:
an act of receiving an additional request, the additional request comprising a request from a third individual to register for the service;
an act of automatically determining that there is insufficient evidence from which to estimate that the third individual is a member of the same organization as any prior registrant; and
an act of continuing to register the third individual in response to the act of automatically determining that there is insufficient evidence from which to estimate that the third individual is a member of the same organization as any prior registrant for the service.

3. The method in accordance with claim 1, wherein the method further comprises:
in response to the notification, an act of receiving an indication from the particular individual that the particular individual is to continue registering; and
an act of continuing to register the particular individual in response to the indication.

4. The method in accordance with claim 1, wherein the method further comprises:
in response to the notification, an act of receiving an indication from the particular individual that the particular individual is not to continue registering; and
an act of ceasing registration for the service by the particular individual in response to the indication.

5. The method in accordance with claim 1, wherein the act of automatically estimating further comprises:
comparing a domain name of an e-mail address provided by the particular individual in the first registration information with a domain name of an e-mail address previously provided by the prior registrant.

6. The method in accordance with claim 5, wherein the act of automatically estimating further comprises:
comparing an account associated with the particular individual with an account associated with the prior registrant.

7. The method in accordance with claim 1, wherein the first registration information includes an e-mail address, the organization name, and the postal code provided by the particular individual, and wherein automatically estimating comprises:
determining that the domain name of the e-mail address provided by the particular individual matches a domain name of an e-mail address provided by the prior registrant;
determining that the organization name provided by the particular individual matches an organization name provided by the prior registrant; and
determining the postal code provided by the first individual matches a postal code provided during the second individual during the prior registration.

8. The method in accordance with claim 1, wherein the act of notifying comprises:
an act of particular individual with an indication of a location of the prior registrant, based on the postal code provided by the prior registrant.

9. The method in accordance with claim 8, wherein the act of presenting the particular individual with an indication of a location of the prior registrant comprises:
an act of displaying the location of the prior registrant on a map.

10. The method in accordance with claim 1, wherein the act of notifying comprises:
an act of presenting the particular individual with the postal code and organization name provided by the prior registrant.

11. One or more physical computer storage devices having thereon computer-executable instructions that, when executed by one or more processors of a computing system cause the computing system to formulate the following modules:
a registration module configured to receive requests for registration for a network service and gather registration information for each individual requesting registration, the registration information comprising, for each individual requesting registration, an e-mail address, an organization name, and a postal code; and
an organization estimation module configured to automatically estimate whether each individual requesting registration might belong to the same organization as a prior registrant for the service by comparing at least the organization name, and the postal code of each individual requesting registration with one or more organization names, and one or more postal codes of prior registrants for the service,
wherein the registration module is further configured to notify a particular individual requesting registration if a prior registrant might belong to the same organization as the particular individual requesting registration by, prior to registering the particular individual to the service, presenting the particular individual with a notice of the existence of the prior registrant that is already registered to the service, along with an option to either continue registration despite the existence of the prior registrant or to cease registration;
the registration module being further configured to receive a first indication from the particular individual that the particular individual is to continue registering subsequent to presenting the option.

12. The computer storage devices in accordance with claim 11, wherein the computing system further formulates a postal code module that determines a geographical location associated with a postal code provided by individuals requesting registration, wherein if the organization estimation module estimates that the particular individual might belong to the same organization as the prior registrant for the service, the registration module notifies the particular individual of a geographical location of the prior registrant, and compares the geographical location of the prior registrant with the geographical location of the particular individual using the postal code provided by the particular individual.

13. The computer storage devices in accordance with claim 12, wherein the registration module compares the geographical location of the prior registrant with the geographical location of the particular individual by presenting a map.

14. The computer storage devices in accordance with claim 13, wherein the registration module displays two geographical locations on the map, one corresponding to the postal code of the prior registrant and one corresponding to the postal code of the particular individual.

15. The computer storage devices in accordance with claim 11, wherein the registration module is configured to continue registering individuals which respond to the notification indicating that they are to continue registering.

16. The computer storage devices in accordance with claim 11, wherein the registration module is configured to discontinue registering individuals which respond to the notification indicating that they are to discontinue registering.

17. A method, implemented at a computing system that includes one or more processors, for protecting against unintentional duplicate registrations for a service by individuals belonging to the same organization, the method comprising:
    an act of receiving a first request to register for a service from a first individual over a network;
    an act of automatically estimating that the first individual might belong to the same organization as a first prior registrant for the service based on comparing registration information provided by each of the first individual and the first prior registrant, and determining that at least the following indicate that the first individual and the first prior registrant are estimated to be part of the same organization:
    an organization name provided by each of the first individual and the first prior registrant, and
    a postal code provided by each of the first individual and the first prior registrant;
    prior to registering the first individual to the service, an act of notifying the first individual over the network that there exists a first prior registrant that is already registered to the service that might belong to the same organization as the first individual, along the option to continue registering despite the existence of the first prior registrant, or to cease registration;
    in response to the notification of the first individual, an act of receiving a first indication from the first individual that the first individual is to continue registering;
    an act of continuing to register the individual in response to the first indication;
    an act of receiving a second request to register for a service from a second individual over the network;
    an act of automatically estimating that the second individual might belong to the same organization as a second prior registrant for the service based on comparing registration information provided by each of the second individual and the second prior registrant, and determining that at least the following indicate that the second individual second prior registrant are estimated to be part of the same organization:
    an organization name provided by each of the second individual and the second prior registrant, and
    a postal code provided by each of the second individual and the second prior registrant;
    prior to registering the second individual to the service, an act of notifying the second individual over the network that there exists a second prior registrant that is already registered to the service that might belong to the same organization as the second individual, along with an option to continue registering despite the existence of the second prior registrant, or to cease registration;
    in response to the notification of the second individual, an act of receiving a second indication from the second individual that the second individual is not to continue registering; and
    an act of ceasing registration for the service by the second individual in response to the second indication.

18. The method in accordance with claim 17, further comprising:
    an act of receiving a third request to register for the service from a third individual over the network;
    an act of automatically determining that there is insufficient evidence from which to estimate that the third individual is a member of the same organization as any prior registrant; and
    an act of continuing to register the third individual in response to the third request, and in response to the act of automatically determining that there is insufficient evidence from which to estimate that the third individual is a member of the same organization as any prior registrant for the service.

* * * * *